Feb. 26, 1946. D. HEYER 2,395,625
VARIABLE SPEED DRIVE
Filed Dec. 14, 1942 4 Sheets-Sheet 1

DON HEYER,
INVENTOR.

BY

ATTORNEY.

Feb. 26, 1946. D. HEYER 2,395,625
VARIABLE SPEED DRIVE
Filed Dec. 14, 1942 4 Sheets-Sheet 2
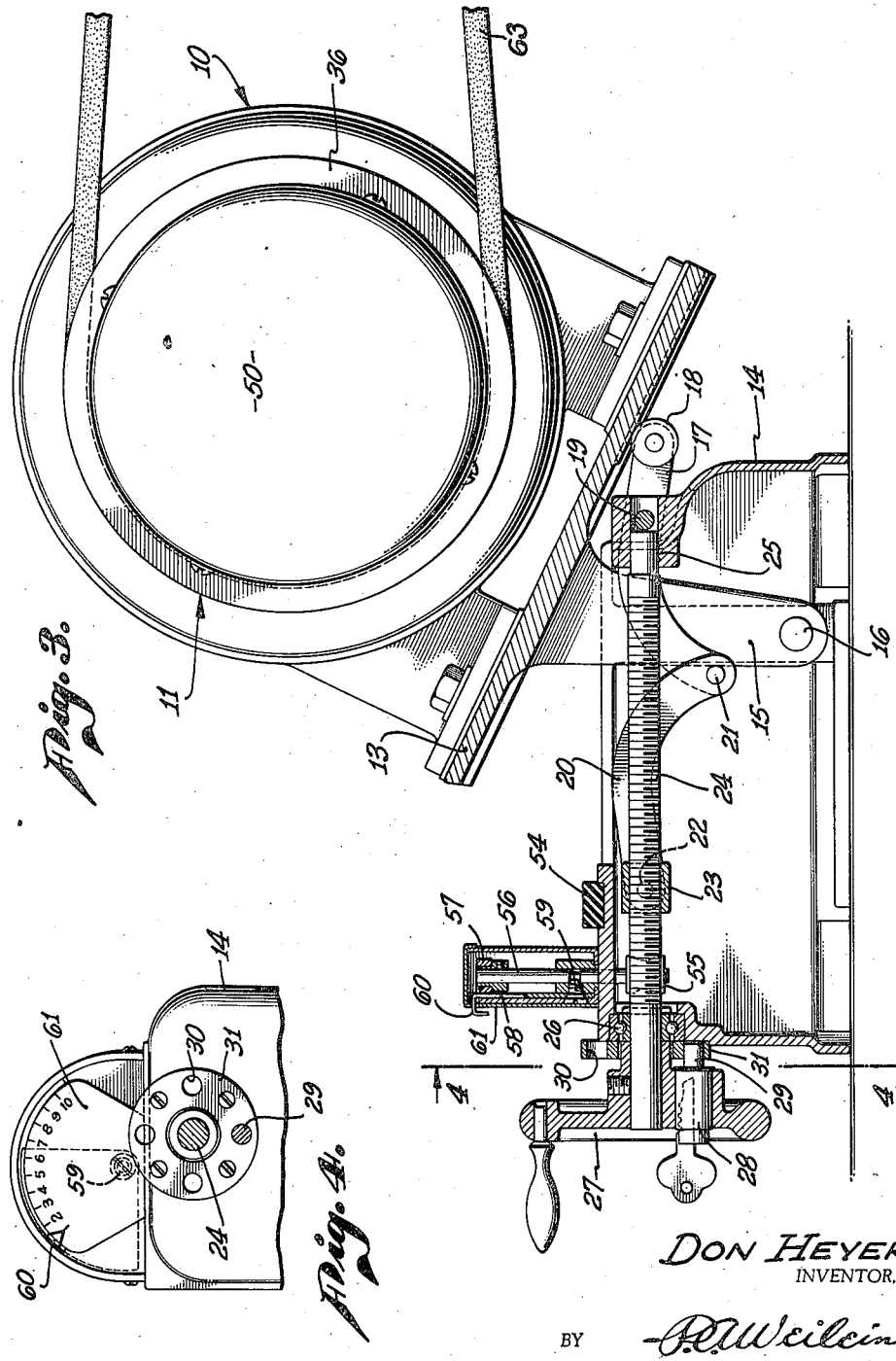
DON HEYER,
INVENTOR,
BY
ATTORNEY.

Feb. 26, 1946.   D. HEYER   2,395,625
VARIABLE SPEED DRIVE
Filed Dec. 14, 1942   4 Sheets-Sheet 3

DON HEYER,
INVENTOR.
BY
ATTORNEY.

Feb. 26, 1946.  D. HEYER  2,395,625
VARIABLE SPEED DRIVE
Filed Dec. 14, 1942  4 Sheets-Sheet 4
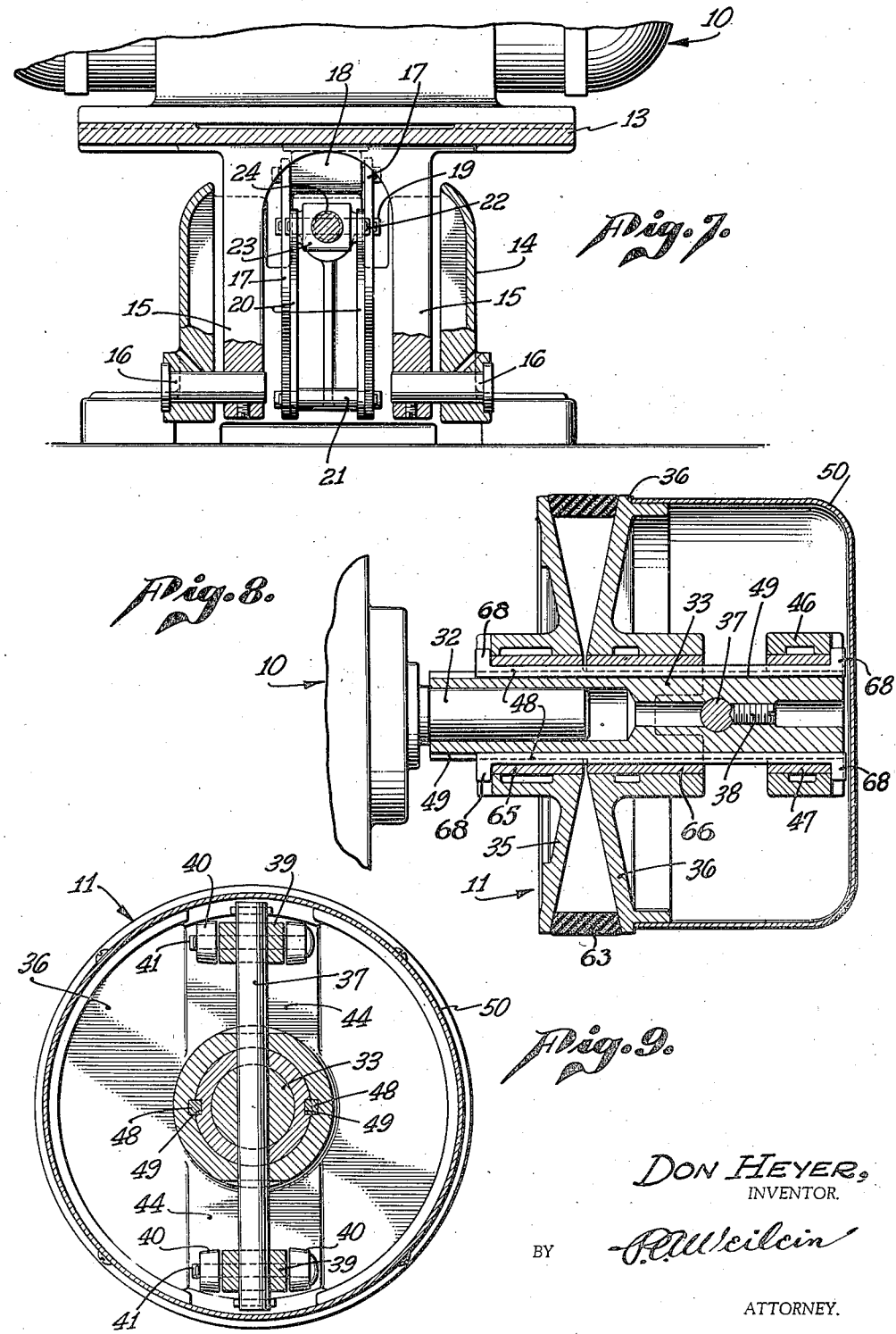
DON HEYER,
INVENTOR.
BY
ATTORNEY.

Patented Feb. 26, 1946

2,395,625

UNITED STATES PATENT OFFICE 2,395,625

VARIABLE-SPEED DRIVE

Don Heyer, Los Angeles, Calif.

Application December 14, 1942, Serial No. 468,891

25 Claims. (Cl. 74—230.17)

This invention relates to variable speed drives, and more particularly to variable speed drives of the type employing a pair of pulley devices and a belt for transmitting power between the pulley devices, and in which the speed adjustment is effected by varying the effective diameter of at least one of the pulley devices.

In general, the variable ratio drive contemplated by the invention includes a pair of pulley structures operatively connected by an edge active belt. One of the pulley structures is of the adjustable diameter type including a pair of relatively axially adjustable sections having opposed conical faces engaging the edges of the belt. By adjusting the distance between the pulley faces the belt is caused to operate over different effective pulley diameters. When the other pulley has a fixed diameter it is necessary to make the distance between the pulley centers variable to maintain proper belt tension as the diameter of the adjusted pulley is changed.

It is common to provide spring operated mechanism for urging the pulley centers apart and maintaining proper belt tension. Under such circumstances, means are usually provided for positively moving the pulley sections together, forcing the belt radially outwardly on the adjustable pulley and causing the center distance to decrease against the force of the spring. When the means urging the pulley sections together is relaxed, the pull on the belt forces the sections apart and the belt moves inwardly to a lesser effective diameter on the adjustable pulley. This allows the spring to increase the center distance to maintain proper belt tension.

In the instant case the adjustable pulley is shown, for example, as the driving pulley and includes centrifugally operated means urging the sections together to increase the effective diameter in response to its rotation. When the speed decreases, the centrifugal force decreases, and the belt tension which is substantially constant, forces the sections apart. Thus, as the speed approaches zero, the sections attain their greatest separation resulting in a minimum effective diameter. Hence the driving pulley is always in low ratio adjustment for starting the load.

In an adjustable speed drive of this type where only one of the pulley structures is equipped with means for adjusting its effective diameter, provision must be made for maintaining the belt in alignment. This may be done by adjusting the axial positions of the movable pulley sections by substantially equal and opposite increments during adjustment of the effective diameter of the pulley.

It is an object of the present invention to provide an adjustable diameter pulley structure including simple and effective means for simultaneously and oppositely adjusting the axial positions of both of the pulley sections, and which may be employed in an adjustable ratio drive in which either one or both of the pulley structures have an adjustable effective diameter.

In many applications of power transmission, it is desirable to start the driven load with the transmission in a low ratio high torque position, thus allowing the driving mechanism to operate with a minimum torque on starting. As the speed of the load increases the torque requirement decreases and it is desirable to automatically change the relative effective diameters of the pulleys to increase the speed ratio with respect to the driven load. In the present instance this is done by means of a centrifugal device associated with the driving pulley, which increases the effective diameter of the driving pulley as it picks up speed. It is further desirable to have this increase in diameter continue only until it reaches a given value, which is determined by the setting of a control means, arranged to the preset while the machine is at rest or during operation. When using such a device as above described it is necessary to assure that the transmission will operate automatically to be in a low ratio, high torque position, when the machine is at rest.

It is therefore an object of the present invention to provide a variable ratio drive which is so arranged as to insure its parts being in a position to cause low ratio, high torque starting of the driven load.

It is a further object of the present invention to provide a variable speed drive which will, after starting, automatically change its driving ratio from a minimum ratio maximum torque position, to a position of definite adjustable ratio so as to impart a predetermined speed to the driven load.

It is a still further object of the present invention to provide means for adjusting the speed ratio which will automatically be assumed between the driving and driven pulleys, and which adjustment can be made readily, either while the machine is at rest or while it is in operation.

It is a further object of the present invention to provide means for causing the variable ratio drive to automatically return to its low ratio high torque position upon discontinuance of operation of the machine.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Figure 3 is an enlarged vertical section taken approximately through the center of the hand wheel shown in Figure 2, with the parts of the device in a different operating position from that shown in Figure 1;

Figure 4 is an enlarged fragmentary section taken on line 4—4 of Figure 3;

Figure 7 is a section through the base, taken as indicated by the line 7—7 of Figure 1;

Figure 8 is a section taken on line 8—8 of Figure 6; and

Figure 9 is a section taken as indicated by line 9—9 of Figure 6.

Figures 1, 2:
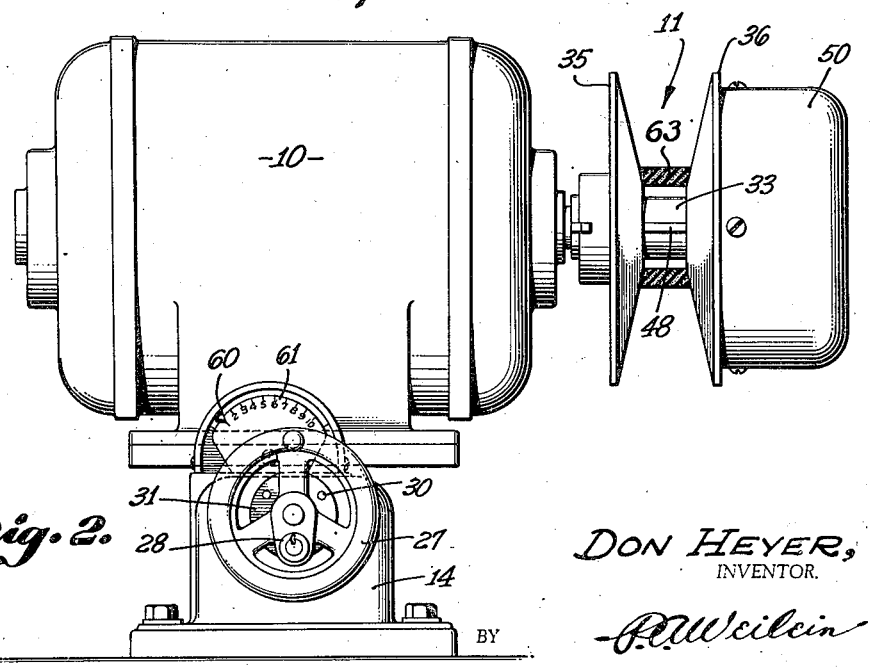
Figure 1 is a side elevation partly in section of a structure embodying one form of the present invention.
Figure 2 is an elevation taken from the left side of the device shown in Figure 1.
Figure 5:
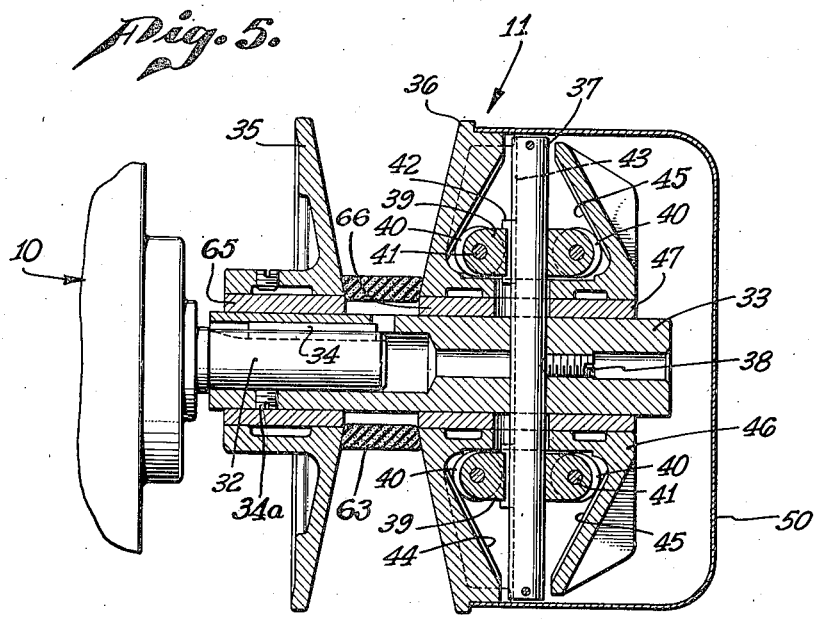
Figure 5 is a section through the center of one of the pulley devices, with the parts in a position to give low speed, high torque.
Figure 6:
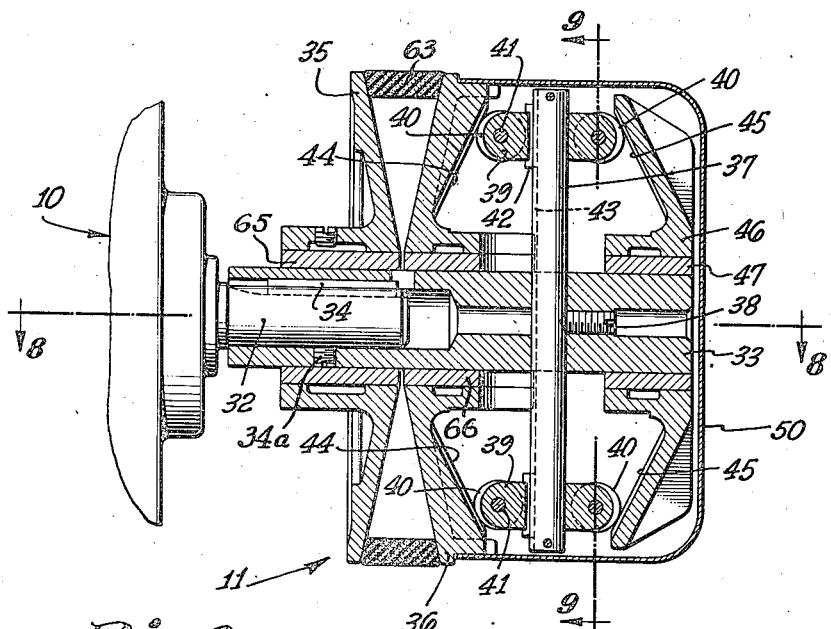
Figure 6 is a section similar to Figure 5, but with the parts in high speed position.

In the embodiment of the invention shown in the drawings, the driving pulley structure 11 is mounted on the shaft of an electric motor 10, and by means of a belt 63, drives the driven or load driving pulley structure 12, mounted on the load driving shaft 62. The driving pulley structure 11, includes a pair of pulley sections, which are adjustable axially toward and from each other to obtain the different effective pulley diameters. The driven pulley structure 12 is shown as having a fixed effective diameter.

When, as shown, the driven pulley structure 12 has a fixed effective diameter, and it is desired to adjust the effective diameter of the driving pulley 11 to adjust the speed ratio, it is necessary to adjust the center distance between pulleys 11 and 12 to maintain proper tension of the belt 63 according to the varying diameter of the driving pulley structure.

In order to support the motor 10 and the variable diameter pulley structure 11 for movement to alter the center distance between the pulley structures 11 and 12 in response to or to cause variations in the effective diameter of the pulley 11, the base of the motor 10 is secured to a movable platform 13. As shown in Figures 1, 3 and 7, this platform is mounted on a base 14, by means of arms 15, for swinging movement about the pivot 16. It can be seen, that swinging of the platform 13 about the pivot 16 alters the center distance between the driving and driven pulleys.

The amount of this swinging movement is controlled by means of an adjustable abutment mounted on the base 14, and which is engageable with the underside of the platform 13 forwardly of the pivot 16. The abutment is shown as being in the form of a roller 18 rotatably mounted on one end of a lever member 17, shown as comprising a pair of arms between which the roller 18 is mounted. The lever 17 is pivoted intermediate its ends as at 19 to the base 14.

The position of the abutment roller 18 is adjustable with respect to the base by rotating the lever member 17 about the pivot 19. This is accomplished by means of a pair of links 20, one end of each of which is pivotally connected to the ends of the lever arms 17 as at 21. The opposite ends of links 20 are pivotally connected at 22, to a nut 23 mounted for adjustment along a screw 24 which is supported for rotation on the base 14 by means of the bearings 25 and 26. Rotation of this screw 24 is accomplished by means of a hand wheel or crank 27, which may be locked against rotation by means of a lock 28 having a bolt 29 optionally engageable with any one of the openings 30 in a plate 31 secured to the base 14. In this way, the hand wheel 27 together with screw 24 and nut 23 may be locked in adjusted position.

The mechanism of the variable diameter pulley 11 is clearly shown in Figures 5 to 9. A short shaft 33 is fixedly secured to the motor shaft 32 by means of a key 34 and a set screw 34a, forming in effect an extension of the motor shaft. Slidably mounted on this shaft 33 is a pair of pulley sections 35 and 36 having inclined confronting belt engaging surfaces. When these pulley sections approach each other the effective diameter of the pulley is increased and the belt is moved toward the periphery of the pulley. As the pulley 12 is of the ordinary fixed diameter type it is necessary that the two pulley sections 35 and 36 move substantially the same distance in opposite directions during any change in effective diameter.

It was mentioned before that it is desired to have the machine start with the pulley sections in such a position that the driven pulley is driven with a low speed and high torque, the speed to increase once the machine is started. Both of these objects have been achieved in the present instance by the provision of a centrifugal device which tends to decrease the distance between the pulley sections 35 and 36, and to thus increase the effective diameter of the pulley 11. This centrifugal device also assures that a given movement of the pulley section 35 is accompanied by a corresponding movement of the pulley section 36 in the opposite direction.

As best shown in Figures 5, 6, 8 and 9, an elongated pin 37 extends diametrically through shaft 33 and is secured thereto by a set screw 38. Slidably mounted on pin 37 is a pair of weights 39, which comprise the centrifugal device. Each weight 39 has a pair of small rollers 40, rotatably mounted on opposite sides thereof by means of pins 41, passing through the respective weights and carrying the rollers on their opposite ends. Each weight 39 has a key 42 secured thereto, which engages slot 43 formed in pin 37 and restricts rotation of the weight about the rod. It is obvious that centrifugal force acting on weights 39 in response to rotation of shaft 33 will urge the weights outwardly along pin 37 with respect to the shaft.

Pulley section 36 has a pair of diametrically opposite inclined cam surfaces 44 against which one set of rollers 40 on weights 39 respectively bear. A pair of correspondingly inclined cam surfaces 45 facing respectively surfaces 44 and inclined in the opposite direction, are formed on a member 46. Member 46 is secured to a bushing 47, which is axially slidable on shaft 33.

Pulley sections 35 and 36 are similarly secured to bushings 65 and 66 which are also axially slidable on shaft 33. To prevent rotation of the pulley sections and member 46 with respect to shaft 33, a pair of splines or long keys 48 are provided (Figs. 8 and 9). These keys 48 engage suitable keyways in bushings 47, 65 and 66 and are slidably mounted on slots 49 in the shaft 33. Each of keys 48 has heads 68 formed on its opposite ends which engage respectively the outer sides of the member 46 and of the pulley section 35. Thus, as the member 46 moves to the right in response to outward movement of weights 39 pulley section 35 also moves to the right. Outward movement of weights 39 also causes a movement of pulley section 36 to the left, and since the cam surfaces 44 and 45 are at equal angles to and oppositely inclined with respect to the axis of the pin 37 and this is perpendicular to the axis of shaft 33, the movement of the member 36 is equal in amount to the movement of member 35. Thus, outward movement of the weights 39 results in equal axial movement of the pulley sections toward each other, resulting in an increase in the effective diameter of the pulley 11. A protective cover 50 can be placed over the entire centrifugal device and its associated parts if desired.

In order to maintain the belt under tension and in order to assure that the pulleys will return to low speed ratio, high torque driving position upon discontinuance of operation of the machine, it is necessary to provide some means for moving the motor and pulley to the left as viewed in Figure 1. This has been done in the present instance by the provision of a spring 51, one end of which is secured to the arm 15, the other end of which is adjustably secured to the base 14. This adjustment may be by means of a nut 52 which is held within the coils of the spring, and a cap screw 53 which threadedly engages the nut 52 and passes through a clearance hole in the base 14. Obviously rotation of cap screw 53 will alter the position of nut 52 so as to vary the tension on the spring which in turn will vary the tension of the belt.

The operation of the device should now be clear. When the machine is at rest, the spring 51 holds the motor 10 and the pulley 11 in the position shown in Figure 1 regardless of the position of the lever 17 and the roller 18. Upon starting of the motor, the weights 39 on the pulley 11 will be centrifugally urged outwardly along the pin 37, and their engagement with the opposed cam surfaces 44 and 45 will tend to move the sections 35 and 36 of the pulley 11 together. When this occurs the motor and pulley 11 will be drawn to the right by the increased tension in the belt 63 against the tension spring 51. This continues until the base 13 strikes the roller 18 at which point motion in that direction will cease and the pulley 12 will be driven at a speed determined by the relative diameters of the pulleys 11 and 12 and the speed of the motor 10. The position of the roller 18 can be altered at will, either during operation of the machine or when it is stationary, by simply rotating the hand wheel 27. When the motor is deenergized and begins to slow down the centrifugal force exerted by weights 39 becomes less. This allows pulley sections 35, 36 to be forced apart by the tension in belt 63 due to the force exerted by spring 51. As the speed of the motor continues to fall, the pulley sections are permitted to move farther apart and the motor swings further to the left, until as the motor stops, pulley 11 is at its minimum effective diameter and platform 13 rests on bumper 54.

In order to permit ascertainment of the speed which will be attained by the pulley 12, it is desirable to have some means to indicate the effective diameter of pulley 11. Obviously, such effective diameter is a function of the position of nut 23, and thus is dependent on the direction and amount of rotation of screw 24. Hence indicating means are provided which are actuated in response to rotation of screw 24. Thus, there is provided in the present instance a worm wheel 55 which is in engagement with the threads of the screw 24. This worm wheel operates a shaft 56 which carries a small pinion 57. The pinion 57 turns a gear sector 58 pivotally supported at 59. The gear sector 58 carries an indicating hand 60 which cooperates with appropriate indicia on face plate 61.

Such indicia may indicate the relation existing between pulley sizes for any given adjustment of screw 24, or in the event of a constant speed motor may indicate revolutions per minute. Other functions of speed may be indicated to suit special requirements if desired.

Obviously, it is not necessary that the centrifugally adjusted pulley be mounted on the driving shaft. By appropriate modification, it may be equally as well mounted on the load driving or driven shaft, which would be fixed in position as before. Further, the motor may be fixed in position and the variation in center distance between the shafts accomplished by altering the position of the driven shaft. In other words, the motor may be adjustable to vary the center distance and have a fixed diameter pulley, the load driving shaft being fixed in position and having a variable diameter pulley; the motor may be fixed and have a fixed diameter pulley, the load driving shaft being adjustable and having a variable diameter pulley; or the motor may be fixed and have a variable diameter pulley, while the load driving shaft is adjustable and has a fixed diameter pulley.

I claim:

1. In combination, an adjustable pulley structure having a pair of pulley sections with opposed oppositely inclined belt engaging faces, forming by relative axial adjustment variable effective pulley diameters, a rotatable shaft upon which the pulley sections are mounted for axial movement toward and away from each other along the shaft, centrifugal elements supported by said shaft and urged outwardly therefrom in response to rotation of the shaft, and means forming a pair of cam surfaces spaced axially of the shaft and respectively connected with said pulley sections between which said centrifugal elements are confined, whereby movement of said elements outwardly from the shaft causes the pulley sections to move toward each other.

2. In combination, a shaft, a variable diameter pulley structure on said shaft, including a pair of relatively axially movable pulley sections having opposed oppositely inclined belt engaging faces forming by axial adjustment variable effective pulley diameters, both of said pulley sections being axially movable on said shaft, means forming a cam surface on one of said pulley sections, means forming a second cam surface opposing the first mentioned cam surface and movable axially of the shaft, means for restricting axial separation of said second cam surface forming means and the other of said pulley sections, and a member confined between said cam surfaces and movable in response to rotation of said shaft for controlling the spacing of said cam surfaces, as well as said pulley sections.

3. In combination, a shaft, a variable diameter pulley structure on said shaft, including a pair of relatively axially movable pulley sections having opposed oppositely inclined belt engaging faces forming by axial adjustment variable effective pulley diameters, both of said pulley sections being axially movable on said shaft, means forming a cam surface on one of said pulley sections, means forming a second cam surface opposing the first mentioned cam surface and movable axially of the shaft, guide means secured to the shaft between said surfaces and extending generally radially of the shaft, means for restricting axial separation of said second cam surface forming means and the other of said pulley sections, and a member movable with respect to said guide means and adapted to simultaneously engage said cam surfaces for positioning the pulley sections with respect to said guide means.

4. In combination, a shaft, a variable diameter pulley structure on said shaft, including a pair of relatively axially movable pulley sections having opposed oppositely inclined belt engaging faces forming by axial adjustment variable effective pulley diameters, both of said pulley sections being axially movable on said shaft, means forming a cam surface on one of said pulley sections, means forming a second cam surface opposing the first mentioned cam surface and movable axially of the shaft, means for restricting axial separation of said second cam surface forming means and the other of said pulley sections, and a member confined between said cam surfaces and movable radially with respect to the shaft in response to rotation of said shaft for controlling the spacing of said cam surfaces, as well as said pulley sections, said cam surfaces being inclined equally and oppositely with respect to said shaft whereby the pulley sections move axially by equal and opposite amounts in response to movement of said member.

5. In a variable ratio transmission of the type having a driving shaft, a load driving shaft, a pulley structure on each of said shafts, and means operatively connecting the pulley structures, one of the pulley structures having a variable effective diameter, the center distance between the shafts varying in response to variations in said pulley diameter: a pivotally mounted table forming a support for one of said shafts for movement toward and away from the other shaft, means resiliently urging said table about said pivot in center distance increasing direction, a pivotally mounted lever forming an adjustable stop for limiting movement of the table in center distance decreasing direction, and a worm and nut mechanism for swinging said lever about its pivot to position said stop.

6. A motor support for use with a variable ratio transmission of the type having an adjustable center distance, wherein the ratio of the transmission is a function of the center distance, comprising a base member, a platform, means pivoting said platform to said base for movement in a center distance varying direction, a lever mounted on said base having a portion engaging said platform limiting movement of said platform in a center distance decreasing direction, and means for altering the position of said lever.

7. A motor support for use with a variable ratio transmission of the type having an adjustable center distance, wherein the ratio of the transmission is a function of the center distance, comprising a base member, a platform, means pivoting said platform to said base for movement in a center distance varying direction, a lever having a pair of oppositely directed arms, pivotally mounted on said base at a point spaced from the means pivoting the platform and adjacent the platform, one arm of said lever engaging said platform limiting movement of said platform in a center distance decreasing direction, a horizontal threaded member mounted on said base, and means operably connecting the threaded member with the other arm of said lever, whereby rotation of said threaded member alters the position of said lever.

8. A motor support for use with a variable ratio transmission of the type having an adjustable center distance, wherein the ratio of the transmission is a function of the center distance, comprising a base member, a platform, means pivoting said platform to said base for movement in a center distance varying direction, a lever mounted on said base having one end engaging said platform to limit movement of said platform in a center distance decreasing direction, a horizontal screw mounted on said base, a nut on said screw, and link means connecting said nut to the other end of said lever, whereby rotation of said screw alters the position of said lever.

9. A motor support for use with a variable ratio transmission of the type having an adjustable center distance, wherein the ratio of the transmission is a function of the center distance, comprising a base member, a platform, means pivoting said platform to said base for movement in a center distance varying direction, a lever mounted on said base having a portion engaging said platform limiting movement of said platform in a center distance decreasing direction, means for altering the position of said lever, and spring means urging said platform in a center distance increasing direction.

10. In combination, means forming a shaft, a variable diameter pulley structure mounted on said shaft forming means, including a pair of relatively axially adjustable pulley sections having opposed oppositely inclined belt engaging faces, forming by relative axial adjustment, variable effective pulley diameters, means for determining the axial position of one of said pulley sections, and means for determining the axial position of the other pulley section, comprising a member on said shaft forming means spaced from the pulley structure, guide means carried by the shaft forming means between said member and the pulley structure and extending generally radially from the shaft means, centrifugal means movable along said guide in response to rotation of the shaft means, means operatively connecting said centrifugal means and said member whereby movement of said centrifugal means alters the axial position of said member, and a connection between said member and the pulley section facing the member to cause the axial position of the pulley section to be adjusted by movement of said member, said connection extending slidably through the pulley section adjacent the member.

11. In combination, means forming a shaft, a variable diameter pulley structure mounted on said shaft forming means, including a pair of relatively axially adjustable pulley sections having opposed oppositely inclined belt engaging faces, forming by relative axial adjustment variable effective pulley diameters, an axially adjustable member on said shaft forming means spaced from the pulley structure, guide means carried by the shaft forming means between said member and the pulley structure and extending generally radially from the shaft means, centrifugal means movable along said guide in response to rotation of the shaft means, means operatively connecting said centrifugal means with the adjacent pulley section and with said member whereby movement of said centrifugal means alters the axial positions of said pulley section and said member in opposite directions, and a connection between said member and the other pulley section for causing said pulley section to be adjusted in response to movement of said member.

12. A pulley mount for use with a variable ratio transmission of the type having an adjustable center distance, wherein the ratio of the transmission is a function of the center distance, comprising a base, a platform on which the pulley is rotatably supported, means mounting said platform on said base for movement in a center distance varying direction, a lever mounted on said base having means engageable with said platform to limit movement of said platform in a center distance decreasing direction, and means for altering the position of said lever.

13. A pulley mount for use with a variable ratio transmission of the type having an adjustable center distance, wherein the ratio of the transmission is a function of the center distance, comprising a hollow base member, a platform on which the pulley is rotatably mounted, means mounting said platform on said base for movement in a center distance varying direction, a stop mounted on said base engageable with said platform to limit movement of said platform in a center distance decreasing direction, means for altering the position of said stop, spring means within the base urging said platform in a center distance increasing direction, and means operable from the exterior of the base for altering the tension of said spring.

14. A pulley mount for use with a variable ratio transmission of the type having an adjustable center distance, wherein the ratio of the transmission is a function of the center distance, comprising a hollow base member, a platform on which the pulley is rotatably mounted, means mounting said platform on said base for movement in a center distance varying direction, means forming an adjustable stop engageable with said platform to limit movement of said platform in a center distance decreasing direction, means for adjusting said stop including a threaded member mounted on said base and extending generally in the direction of movement of said platform, spring means within the base urging said platform in a center distance increasing direction, and means for altering the tension of the spring, said threaded member and said tension altering means being operable from the exterior of said base.

15. A pulley mount for use with a variable ratio transmission of the type having an adjustable center distance wherein the ratio of the transmission is a function of the center distance, comprising a base, a platform on which the pulley is rotatably supported, means mounting said platform on said base for movement in a center distance varying direction, a lead screw, an adjustable member threadedly mounted on said lead screw for movement axially thereof in response to rotation of the screw, a stop adapted to engage said platform, means independent of said lead screw mounting said stop for adjustment to limit the movement of said platform in a center distance decreasing direction to a predetermined position, and means operatively connecting said adjustable member with said stop, whereby rotation of the lead screw alters the position of the stop.

16. A pulley mount for use with a variable ratio transmission of the type having an adjustable center distance, wherein the ratio of the transmission is a function of the center distance, comprising a base, a platform on which the pulley is rotatably supported, means mounting said platform on said base for movement in a center distance varying direction, a lead screw, an adjustable member threadedly mounted on said lead screw for movement axially thereof in response to rotation of the screw, a stop adapted to engage said platform, means mounting said stop for adjustment to limit the movement of said platform in a center distance decreasing direction to a predetermined position, said adjustable member and said stop being disposed on opposite sides of said platform mounting means, and means operatively connecting said adjustable member with said stop, whereby rotation of the lead screw alters the position of the stop.

17. A pulley mount for use with a variable ratio transmission of the type having an adjustable center distance, wherein the ratio of the transmission is a function of the center distance, comprising a base, a platform on which the pulley is rotatably mounted, means mounting said platform on said base for movement in a center distance varying direction, a lead screw, an adjustable member threadedly mounted on said lead screw for movement axially thereof in response to rotation of the screw, a stop adapted to engage said platform, means mounting said stop for adjustment to limit the movement of said platform in a center distance decreasing direction to a predetermined position, said adjustable member and said stop being disposed on opposite sides of said platform mounting means, means operatively connecting said adjustable member with said stop whereby rotation of the lead screw alters the position of the stop, and spring means on the opposite side of the platform mounting means with respect to said stop for urging said platform in center distance increasing direction.

18. A pulley mount for use with a variable ratio transmission of the type having an adjustable center distance, wherein the ratio of the transmission is a function of the center distance, comprising a base, a platform on which the pulley is rotatably supported, means pivotally mounting said platform on said base for movement in a direction to vary the center distance, a threaded member extending generally in center distance varying direction, an adjustable member threadedly mounted on said threaded member for movement axially thereof in response to rotation of said threaded member, a stop adapted to engage said platform, means mounting said stop for adjustment to limit the movement of said platform in center distance decreasing direction to a predetermined position, said adjustable member and said stop being disposed on opposite sides of said pivotal mounting means, and means operatively connecting said adjustable member with said stop, whereby rotation of the lead screw alters the position of the stop.

19. A pulley mount for use with a variable ratio transmission of the type having an adjustable center distance, wherein the ratio of the transmission is a function of the center distance, comprising a base, a platform on which the pulley is rotatably supported, means mounting said platform on said base for movement in a direction to vary the center distance, means forming an adjustable stop engageable with said platform to limit movement of said platform in a center distance decreasing direction, means for adjusting said stop including a threaded member mounted on said base and extending generally in center distance varying direction, and means resiliently urging said platform in center distance increasing direction, said stop means and said means urging said platform being disposed on opposite sides of said platform mounting means.

20. In a variable ratio transmission of the type having a driving shaft, a load driving shaft, a pulley structure on each of said shafts, and belt means connecting the pulley structures, one of the pulley structures having a variable effective diameter, the center distance between the shafts varying in response to variations in said pulley diameter; a movably mounted table forming a support for one of said shafts for movement toward and away from the other shaft, means resiliently urging said table in center distance increasing direction, a pivotally mounted lever forming an adjustable stop for limiting movement of the table in center distance decreasing direction, and means for adjusting said lever about its pivot to position said stop.

21. A pulley mount for use with a variable ratio transmission of the type having an adjustable center distance, wherein the ratio of the transmission is a function of the center distance, comprising a platform on which the pulley is rotatably supported, means mounting said platform for movement in a center distance varying direction, an adjustable stop engageable with said platform to limit movement of said platform in a center distance decreasing direction, a threaded member for adjusting the position of said stop, and means for locking said member against rotation to secure said stop in adjusted position.

22. A pulley mount for use with a variable ratio transmission of the type having an adjustable center distance, wherein the ratio of the transmission is a function of the center distance, comprising a base, a platform on which said pulley is rotatably supported, means mounting said platform on said base for movement in a center distance varying direction, an adjustable stop engageable with said platform to limit movement of said platform in a center distance decreasing direction, a threaded member for adjusting the position of said stop rotatably mounted on said base, and carrying an operating member exteriorly of the base and means on said operating member for cooperating with the base to lock the threaded member against rotation, whereby to secure said stop in adjusted position.

23. A pulley mount for use with a variable ratio transmission of the type having an adjustable center distance, wherein the ratio of the transmission is a function of the center distance, comprising a base, a platform on which the pulley is rotatably supported, means mounting said platform for movement in a center distance varying direction, means forming an adjustable stop engaging said platform to limit movement of said platform in a center distance decreasing direction, means for adjusting said stop including a rotatable member, and means for securing said stop in adjusted position, comprising a nonrotatable member mounted on the base adjacent said rotatable member, a key operated projectable bolt carried by one of said members spaced from the axis of said member, there being a plurality of openings in said other member spaced about said axis and adapted for optional engagement by the bolt to retain the rotatable member against rotation.

24. A pulley mount for use with a variable ratio transmission of the type having an adjustable center distance wherein the ratio of the transmission is a function of the center distance, comprising a base, a platform on which the pulley is rotatably supported, means mounting said platform on said base for movement in a center distance varying direction, an adjustable member movably mounted on said base, means for moving said adjustable member, a stop adapted to engage said platform, means independent of said adjustable member mounting said stop for adjustment to limit the movement of said platform in a center distance decreasing direction to a predetermined position, and means connecting said adjustable member with said stop, whereby movement of the member alters the position of the stop.

25. A pulley mount for use with a variable ratio transmission of the type having an adjustable center distance, wherein the ratio of the transmission is a function of the center distance, comprising a base, a platform on which the pulley is rotatably supported, means mounting said platform on said base for movement in a direction to vary the center distance, means forming an adjustable stop engageable with said platform to limit movement of said platform in a center distance decreasing direction, means for adjusting said stop including a member mounted on said base for movement generally in center distance varying direction, and means resiliently urging said platform in center distance increasing direction, said stop means and said means urging said platform being disposed on opposite sides of said platform mounting means.

DON HEYER.